(12) United States Patent
Kim et al.

(10) Patent No.: US 11,516,737 B2
(45) Date of Patent: Nov. 29, 2022

(54) METHOD FOR CHANGING STATUS OF WUS OPERATION AND DEVICE SUPPORTING THE SAME

(71) Applicant: LG Electronics Inc., Seoul (KR)

(72) Inventors: Hongsuk Kim, Seoul (KR); Youngdae Lee, Seoul (KR); Jaewook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 12 days.

(21) Appl. No.: 16/772,064

(22) PCT Filed: Feb. 7, 2019

(86) PCT No.: PCT/KR2019/001537
§ 371 (c)(1),
(2) Date: Jun. 11, 2020

(87) PCT Pub. No.: WO2019/160271
PCT Pub. Date: Aug. 22, 2019

(65) Prior Publication Data
US 2021/0227466 A1    Jul. 22, 2021

Related U.S. Application Data

(60) Provisional application No. 62/630,285, filed on Feb. 14, 2018.

(51) Int. Cl.
*H04W 52/02* (2009.01)
*H04W 68/00* (2009.01)
*H04W 72/04* (2009.01)

(52) U.S. Cl.
CPC ..... *H04W 52/0229* (2013.01); *H04W 68/005* (2013.01); *H04W 72/042* (2013.01)

(58) Field of Classification Search
CPC .......... H04W 52/0229; H04W 68/005; H04W 72/042; H04W 52/0216; H04W 68/025; Y02D 30/70
See application file for complete search history.

(56) References Cited

U.S. PATENT DOCUMENTS

2014/0112221 A1    4/2014   Verger et al.
2016/0212708 A1    7/2016   Kim et al.
(Continued)

OTHER PUBLICATIONS

Nokia, Alcatel-Lucent Shanghai Bell, "Signalling for efficient decoding of physical channels," R1-1708072, 3GPP TSG RAN WG1 Meeting #89, Hangzhou, P.R. China, dated May 15-19, 2017, 8 pages.

(Continued)

*Primary Examiner* — John D Blanton
(74) *Attorney, Agent, or Firm* — Fish & Richardson P.C.

(57) ABSTRACT

Provided are a method of changing status of WUS operation and a device supporting the method. According to one embodiment of the present disclosure, the method includes: receiving system information for enabling a wake up signal (WUS) operation; enabling the WUS operation; receiving a WUS to monitor a paging occasion; receiving, in the paging occasion, control information informing that the WUS operation is disabled; disabling the WUS operation based on the control information; and monitoring a next paging occasion for a paging based on the disabled WUS operation.

10 Claims, 13 Drawing Sheets

(56) References Cited

U.S. PATENT DOCUMENTS

| | | | |
|---|---|---|---|
| 2016/0374022 A1 | 12/2016 | Ang et al. | |
| 2018/0092062 A1* | 3/2018 | Chen | H04W 68/02 |
| 2018/0242306 A1* | 8/2018 | Wong | H04W 72/0413 |
| 2020/0092808 A1* | 3/2020 | Beale | H04W 52/0216 |
| 2020/0229095 A1* | 7/2020 | Shrestha | H04W 8/08 |
| 2020/0267751 A1* | 8/2020 | Shi | H04W 68/02 |
| 2020/0280959 A1* | 9/2020 | Sharma | H04W 52/0219 |
| 2020/0351779 A1* | 11/2020 | Sharma | H04W 76/28 |
| 2020/0374821 A1* | 11/2020 | Wu | H04W 56/001 |

OTHER PUBLICATIONS

Sony, "Wake up signalling for efeMTC," R1-1712956, 3GPP TSG RAN WG1 Meeting #90, Prague, Czech Republic, dated Aug. 21-25, 2017, 13 pages.

* cited by examiner

METHOD FOR CHANGING STATUS OF WUS OPERATION AND DEVICE SUPPORTING THE SAME

CROSS-REFERENCE TO RELATED APPLICATIONS

This application is a National Stage application under 35 U.S.C. § 371 of International Application No. PCT/KR2019/001537, filed on Feb. 7, 2019, which claims the benefit of U.S. Provisional Application No. 62/630,285, filed on Feb. 14, 2018. The disclosures of the prior applications are incorporated by reference in their entirety.

TECHNICAL FIELD

The present invention relates to a wireless communication system, and more particularly, to a method for changing status of WUS operation and a device supporting the same.

BACKGROUND

Efforts have been made to develop an improved 5'-generation (5G) communication system or a pre-5G communication system in order to satisfy a growing demand on radio data traffic after commercialization of a $4^{th}$-generation (4G) communication system. A standardization act for a 5G mobile communication standard work has been formally started in 3GPP, and there is ongoing discussion in a standardization working group under a tentative name of a new radio access (NR).

Meanwhile, an upper layer protocol defines a protocol state to consistently manage an operational state of a user equipment (UE), and indicates a function and procedure of the UE in detail. In the discussion on the NR standardization, an RRC state is discussed such that an RRC_CONNECTED state and an RRC_IDLE state are basically defined, and an RRC_INACTIVE state is additionally introduced.

Meanwhile, wake up signal (WUS) solution has been discussed. In LTE, a base station (BS) may transmit WUS to a UE in idle mode to notify that a paging message will be transmitted. That is, WUS may inform that a paging message will be transmitted subsequently. Then, if the UE detects a WUS, the UE moves from OFF duration i.e., sleep mode to ON duration to monitor (N)PDCCH as in legacy paging monitoring procedure.

SUMMARY

According to a prior art, the UE have to always monitor WUS firstly before monitoring (N)PDCCH once the BS has configured the WUS operation to the UE. It leads to a lot more power consumption, because the UE has to always monitor the WUS even when there is no paging request.

According to an embodiment of the present invention, a method performed by a user equipment (UE) in wireless communication system is provided. The method may comprise: receiving system information for enabling a wake up signal (WUS) operation; enabling the WUS operation; receiving a WUS to monitor a paging occasion; receiving, in the paging occasion, control information informing that the WUS operation is disabled; disabling the WUS operation based on the control information; and monitoring a next paging occasion for a paging based on the disabled WUS operation.

The control information may be different from the system information.

The control information may be downlink control information (DCI) transmitted via a physical downlink control channel (PDCCH).

The control information may be a paging signal message transmitted via a physical downlink shared channel (PDSCH).

The control information may be toggled information.

The system information for the WUS operation may be transmitted, during an initial access procedure to a base station (BS).

The monitoring a next paging occasion for a paging based on the disabled WUS operation may be directly monitoring a PDCCH and a PDSCH, without waiting for a WUS.

The method may further comprise: receiving, in the next paging occasion, control information which does not include information related to the WUS operation; and maintaining the WUS operation to remain in disabled.

According to another embodiment of the present invention, a method performed by abase station (BS) in wireless communication system is provided. The method may comprise: transmitting system information for enabling a wake up signal (WUS) operation to a user equipment (UE); transmitting a WUS to the UE for monitoring a paging occasion; transmitting, in the paging occasion, control information informing that the WUS operation is disabled; and transmitting, in a next paging occasion, a paging message without the WUS to the UE.

The control information may be different from the system information.

The control information may be downlink control information (DCI) transmitted via a physical downlink control channel (PDCCH).

The control information may be a paging signal message transmitted via a physical downlink shared channel (PDSCH).

The control information may be toggled information.

The system information for the WUS operation may be transmitted, during an initial access procedure to a base station (BS).

According to another embodiment of the present invention, a user equipment (UE) in a wireless communication system is provided. The UE may comprise: a transceiver for transmitting or receiving a radio signal; and a processor coupled to the transceiver, the processor configured to: control the transceiver to receive system information for enabling a wake up signal (WUS) operation; enable the WUS operation; control the transceiver to receive a WUS to monitor a paging occasion; control the transceiver to receive, in the paging occasion, control information informing that the WUS operation is disabled; disable the WUS operation based on the control information; and monitor a next paging occasion for a paging based on the disabled WUS operation.

According to embodiments of the present invention, the UE may know whether the WUS operation is enabled or disabled, so that reduce unnecessary power consumption by monitoring WUS signal even when the WUS is disabled.

DETAILED DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

Figure 1:
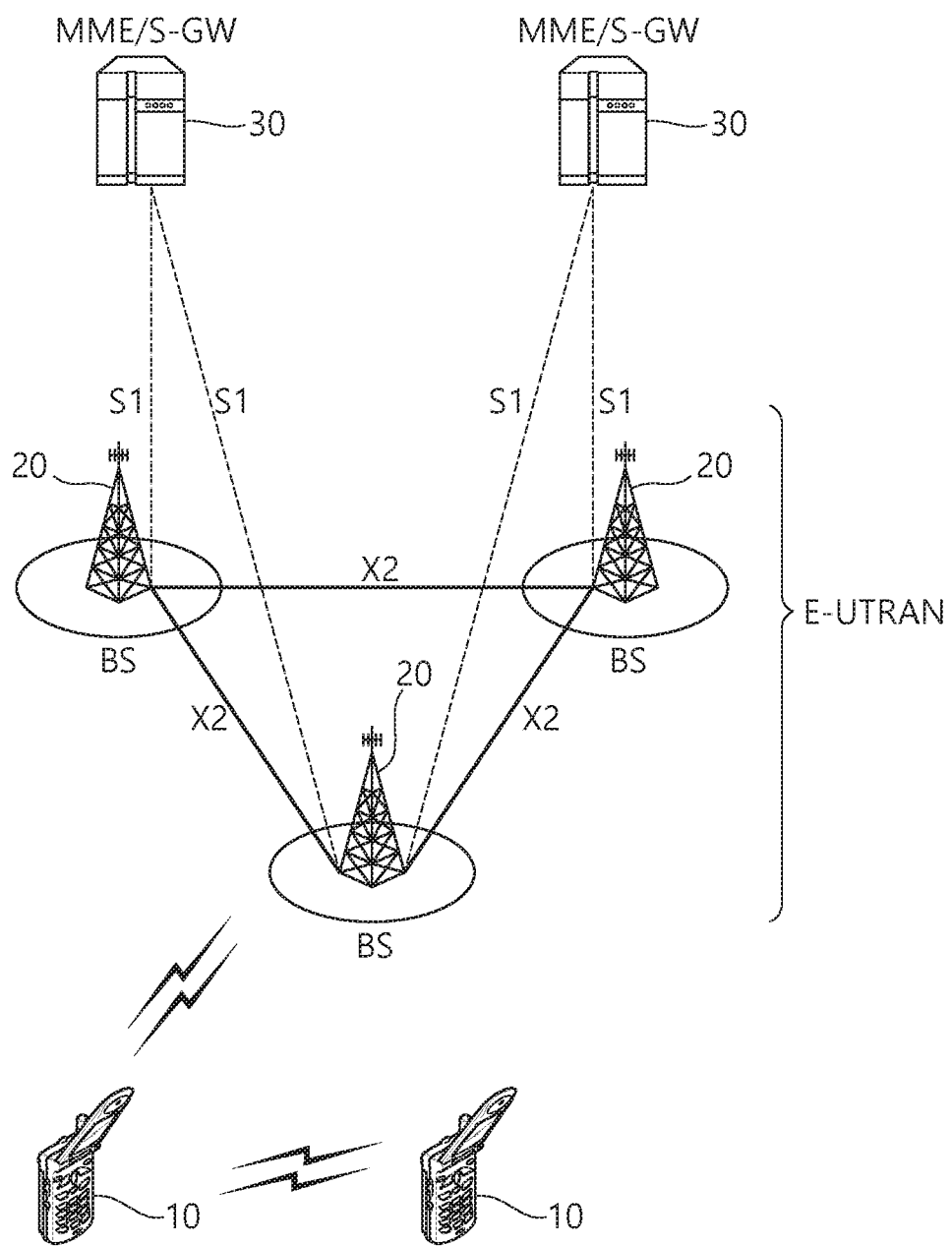
FIG. 1 shows an example of a wireless communication system to which technical features of the present invention can be applied.

FIG. 1 shows an example of a wireless communication system to which technical features of the present invention can be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMEs/S-GWs and BSs.

Figure 2:
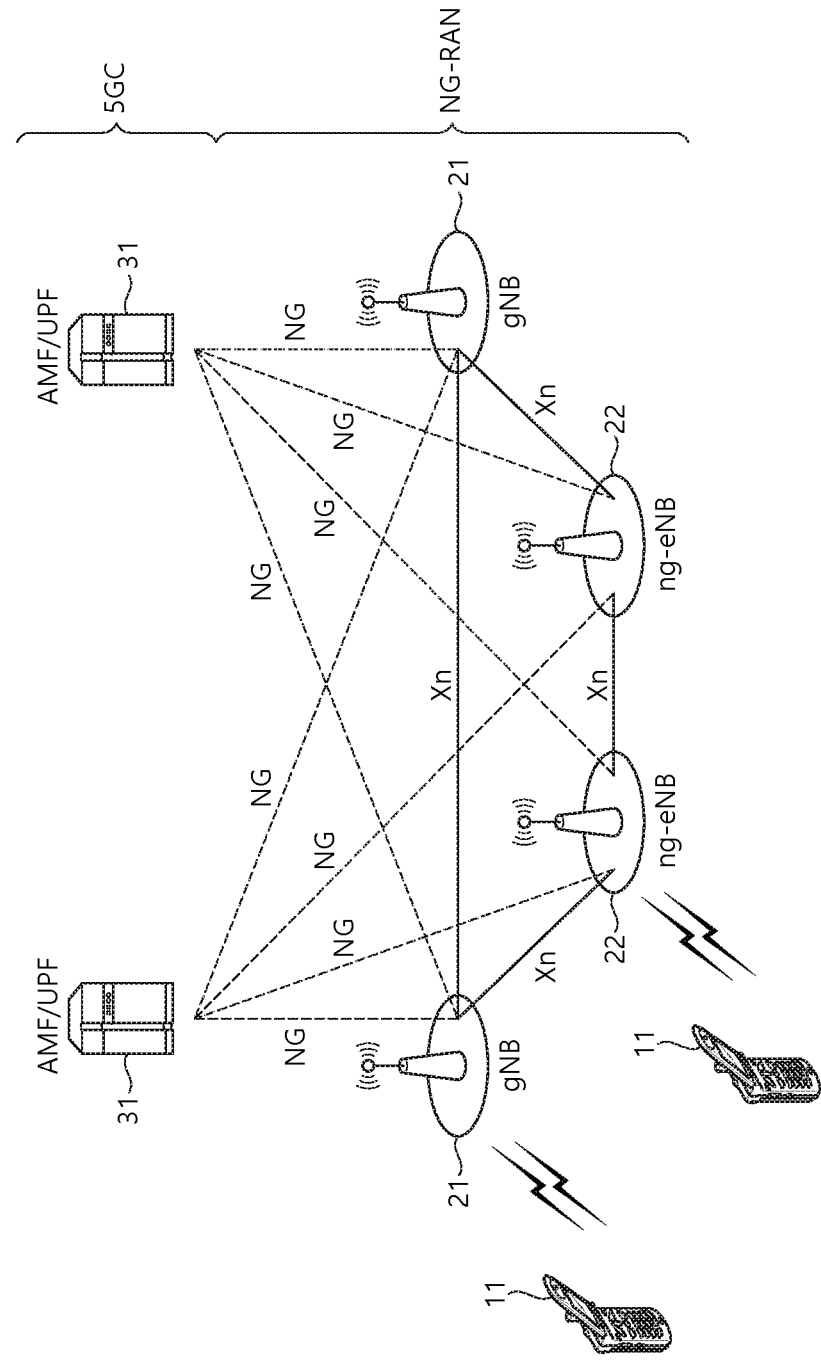
FIG. 2 shows another example of a wireless communication system to which technical features of the present invention can be applied.

FIG. 2 shows another example of a wireless communication system to which technical features of the present invention can be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE/LTE-A.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A protocol structure between network entities described above is described. On the system of FIG. 1 and/or FIG. 2, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 3:
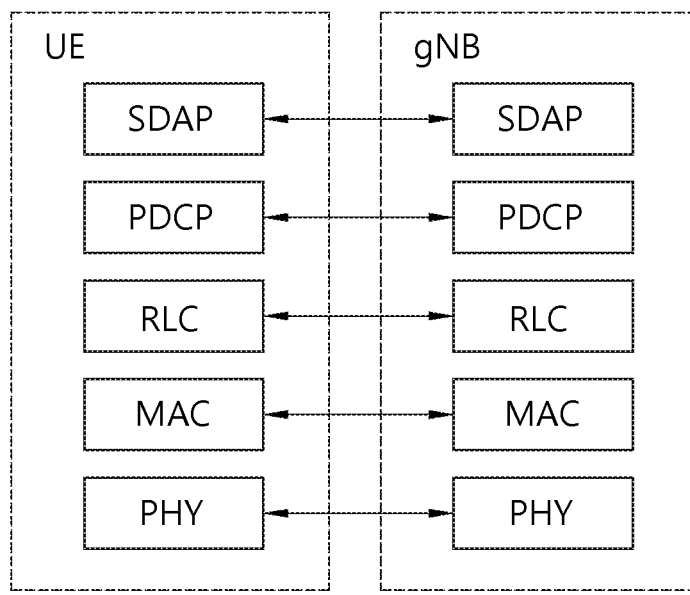
FIG. 3 shows a block diagram of a user plane protocol stack to which technical features of the present invention can be applied.
Figure 4:
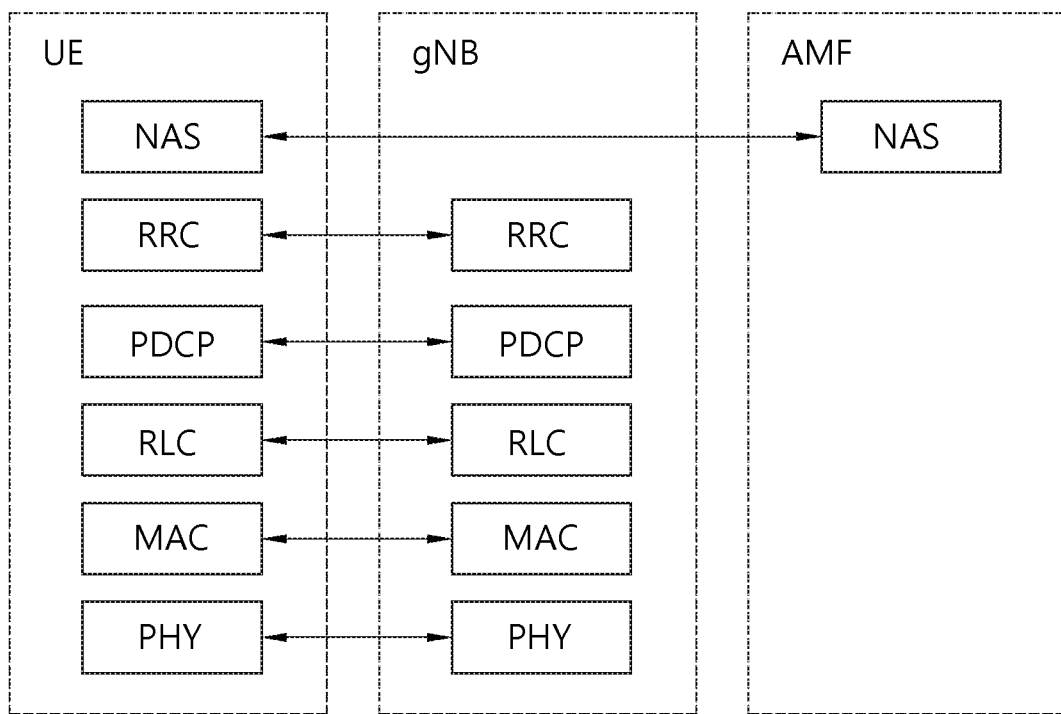
FIG. 4 shows a block diagram of a control plane protocol stack to which technical features of the present invention can be applied.

FIG. 3 shows a block diagram of a user plane protocol stack to which technical features of the present invention can be applied. FIG. 4 shows a block diagram of a control plane protocol stack to which technical features of the present invention can be applied. The user/control plane protocol stacks shown in FIG. 3 and FIG. 4 are used in NR. However, user/control plane protocol stacks shown in FIG. 3 and FIG. 4 may be used in LTE/LTE-A without loss of generality, by replacing gNB/AMF with eNB/MME.

Referring to FIG. 3 and FIG. 4, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the base station.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Hereinafter, paging procedure is described.

The purpose of this procedure is:
- to transmit paging information to a UE in RRC_IDLE and/or;
- to inform UEs in RRC_IDLE and UEs other than NB-IoT UEs in RRC_CONNECTED about a system information change and/or;
- to inform UEs other than NB-IoT UEs about an ETWS primary notification and/or ETWS secondary notification and/or;
- to inform UEs other than NB-IoT UEs about a CMAS notification and/or;
- to inform UEs other than NB-IoT UEs in RRC_IDLE about an EAB parameters modification and/or;
- to inform UEs other than NB-IoT UEs in RRC_IDLE to perform E-UTRAN inter-frequency redistribution procedure.

The paging information is provided to upper layers, which in response may initiate RRC connection establishment, e.g. to receive an incoming call.

E-UTRAN initiates the paging procedure by transmitting the Paging message at the UE's paging occasion. E-UTRAN may address multiple UEs within a Paging message by including one PagingRecord for each UE. E-UTRAN may also indicate a change of system information, and/or provide an ETWS notification or a CMAS notification in the Paging message.

Upon receiving the Paging message, the UE shall:
1> if in RRC_IDLE, for each of the PagingRecord, if any, included in the Paging message:
2> if the ue-Identity included in the PagingRecord matches one of the UE identities allocated by upper layers:
3> forward the ue-Identity and, except for NB-IoT, the cn-Domain to the upper layers;
1> if in RRC_INACTIVE, for each of the PagingRecord, if any, included in the Paging message:
2> if the ue-Identity included in the PagingRecord matches the stored full I-RNTI:
3> if UE is configured with one or more access identities equal to 1, 2 or 11-15 applicable in the selected PLMN:
4> initiate RRC connection resume procedure with cause value set to 'highProrityAccess';
3> else:
4> initiate the RRC connection resumption procedure with cause value set to 'mt-access';
2> else if the ue-Identity included in the PagingRecord matches one of the UE identities allocated by upper layers:
3> forward the ue-Identity, accessType (if present) and the cn-Domain to the upper layers;
3> perform the actions upon leaving RRC_INACTIVE, with release cause 'other';
1> if the UE is not configured with a DRX cycle longer than the modification period and the systemInfoModification is included; or
1> if the UE is configured with a DRX cycle longer than the modification period and the systemInfoModification-eDRX is included:
2> re-acquire the required system information using the system information acquisition procedure.

1> if the etws-Indication is included and the UE is ETWS capable:
2> re-acquire SystemInformationBlockType1 immediately, i.e., without waiting until the next system information modification period boundary;
2> if the schedulingInfoList indicates that SystemInformationBlockType10 is present:
3> acquire SystemInformationBlockType10;
If the UE is in CE, it is up to UE implementation when to start acquiring SystemInformationBlockType10.
2> if the schedulingInfoList indicates that SystemInformationBlockType11 is present:
3> acquire SystemInformationBlockType11;
1> if the cmas-Indication is included and the UE is CMAS capable:
2> re-acquire SystemInformationBlockType1 immediately, i.e., without waiting until the next system information modification period boundary;
2> if the schedulingInfoList indicates that SystemInformationBlockType12 is present:
3> acquire SystemInformationBlockType12;
1> if in RRC_IDLE, the eab-ParamModification is included and the UE is EAB capable:
2> consider previously stored SystemInformationBlockType14 as invalid;
2> re-acquire SystemInformationBlockType1 immediately, i.e., without waiting until the next system information modification period boundary;
2> re-acquire SystemInformationBlockType14 using the system information acquisition procedure;
1> if in RRC_IDLE, the redistributionIndication is included and the UE is redistribution capable:
2> Perform E-UTRAN inter-frequency redistribution procedure;

Meanwhile, the Paging-NB message is used for the notification of one or more UEs. The Paging-NB message is provided to UE in similar manner of the Paging message.

Table 1 shows IE of paging-NB message.

Recently, wake up signal (WUS) solution has been discussed. In LTE, abase station (BS) may transmit WUS to a UE in idle mode to notify that a paging message will be transmitted. That is, WUS may indicate that a paging message will be transmitted subsequently. Then, if the UE detects a WUS, the UE moves from OFF duration i.e., sleep mode to ON duration to monitor (N)PDCCH as in legacy paging monitoring procedure.

Figure 5:
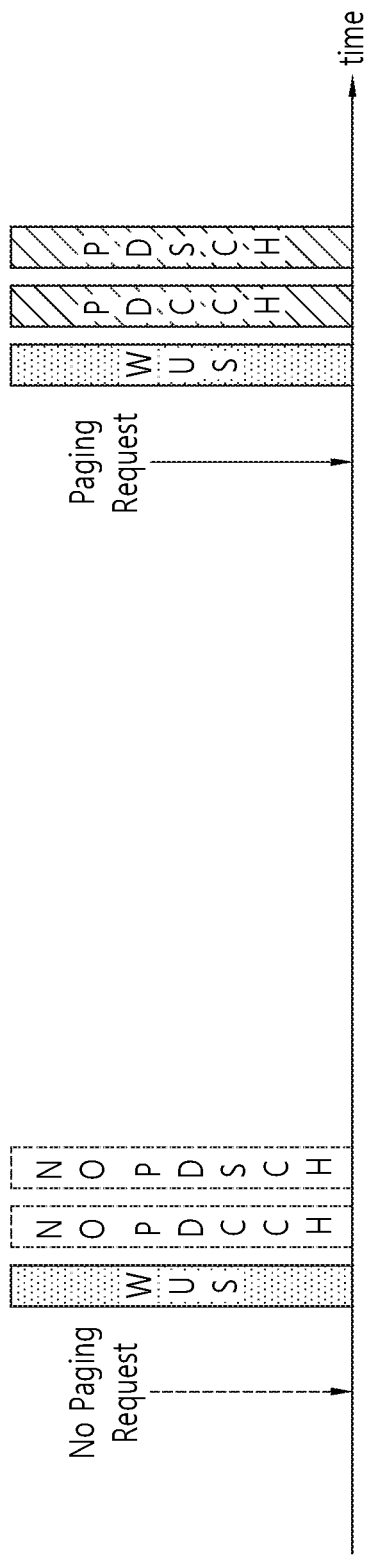
FIG. 5 shows a current process of the WUS mechanism.

FIG. 5 shows a current process of the WUS mechanism.

As shown in FIG. 5, upon WUS configuration, the UE may wake up and monitor WUS from sleep mode. If the WUS is not signaled, the UE may go to sleep without (N)PDCCH monitoring for paging. On the other hand, if the WUS is signaled, the UE may monitor (N)PDCCH for the paging. Therefore, according to the current procedure, the UE have to always monitor WUS firstly before monitoring (N)PDCCH once the BS has configured the WUS operation to the UE. It leads to a lot more power consumption, because the UE has to always monitor the WUS even when there is no paging request.

To solve the problem described above, a method for changing status of WUS operation according to an embodiment of the present invention is described.

According to an embodiment of the present invention, when a UE may initially enter a network which provides function of wake up signaling (WUS) operation, the UE may start acquiring WUS operation status and the WUS configuration based on system information (SI). Through (broadcasting) SI, the network may indicate the current WUS operation status (e.g. WUS enabled/disabled) and the WUS configuration (e.g. WUS signaling position, period, repetition). The SI which indicates current WUS operation status and the WUS configuration may be transmitted in a paging occasion or before the paging occasion.

If WUS is enabled, the UE may enable the WUS operation and monitor WUS signaling. After that, when the UE receives WUS signaling, the UE may monitor PDCCH/NPDCCH/MPDCCH for receiving paging information. Else

TABLE 1

```
-- ASN1START
Paging-NB ::=                        SEQUENCE {
    pagingRecordList-r13                 PagingRecordList-NB-r13    OPTIONAL,  -- Need ON
    systemInfoModification-r13           ENUMERATED {true}          OPTIONAL,  -- Need ON
    systemInfoModification-eDRX-r13      ENUMERATED {true}          OPTIONAL,  -- Need ON
    nonCriticalExtension                 SEQUENCE { }               OPTIONAL
}
PagingRecordList-NB-r13 ::=          SEQUENCE (SIZE (1..maxPageRec)) OF PagingRecord-NB-r13
PagingRecord-NB-r13 ::=              SEQUENCE {
    ue-Identity-r13                      PagingUE-Identity,
    ...
}
-- ASN1STOP
```

The IE systemInfoModification of Table 1, if present, is indication of a BCCH modification other than for SystemInformationBlockType14-NB (SIB14-NB) and SystemInformationBlockType6-NB (SIB16-NB). This indication does not apply to UEs using eDRX cycle longer than the BCCH modification period. The IE systemInfoModification-eDRX of Table 1, if present, is indication of a BCCH modification other than for SystemInformationBlockType14-NB (SIB14-NB) and SystemInformationBlockType16-NB (SIB16-NB). This indication applies only to UEs using eDRX cycle longer than the BCCH modification period. The IE ue-Identity of Table 1 provides the NAS identity of the UE that is being paged.

if WUS is disabled, the UE may disable WUS operation. Then the UE may monitor PDCCH/NPDCCH/MPDCCH without monitoring WUS signaling for receiving paging information.

The network may transmit paging DCI or paging signaling message to inform change of status of WUS operation. Upon receiving paging information via Paging DCI or Paging signaling message, the UE may change the status of the current WUS operation from the next WUS period if the paging information indicates to change the status of the WUS operation (e.g. from WUS enabled to disabled or from WUS disabled to enabled). The paging DCI or paging signaling which indicates current WUS operation status and the WUS configuration may be transmitted in a paging occasion or before the paging occasion.

If the paging message is directly indicated by DCI of PDCCH/NPDCCH/MPDCCH, the UE may not monitor PDSCH/NPDSCH for receiving paging information. The network may transmit paging information to change the status of WUS operation. However, the network actually may update system information for indicating WUS operation status to UE which has initial access. Once the status of WUS operation is changed, the UE may keep the changed status of WUS operation until the network indicates to change WUS operation again.

When the UE receives the status of the WUS operation via paging DCI paging message, the UE may not read the system information. Otherwise, the network may indicate system information modification since also other information should be updated.

According to embodiments of the present invention, the UE may know whether the WUS operation is enabled or disabled, so that reduce unnecessary power consumption by monitoring WUS signal even when the WUS is disabled. More detailed features of embodiments of the present invention are described below.

Figure 6:
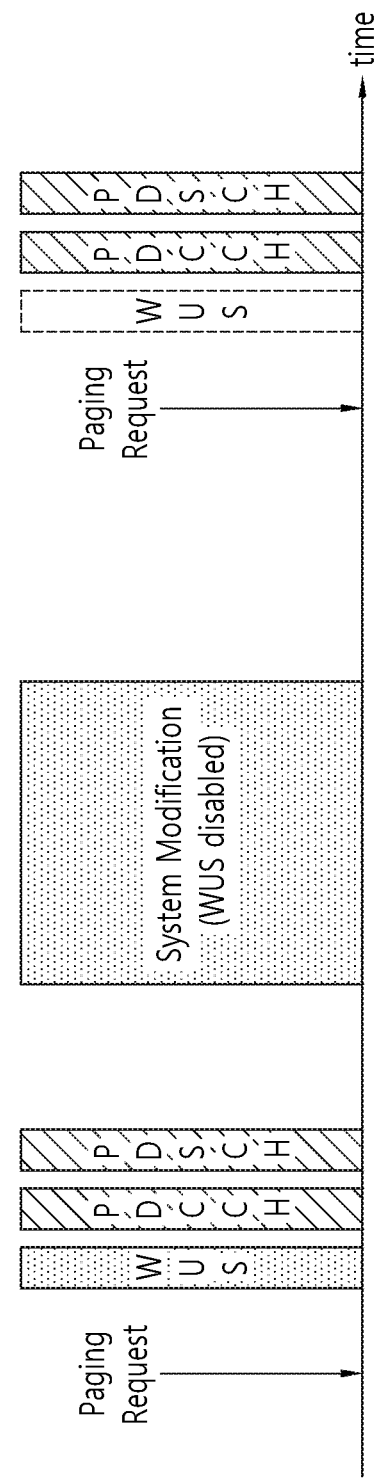
FIG. 6 shows a process of WUS mechanism.

FIG. 6 shows a process of WUS mechanism. The UE may change status of WUS operation according to a SI received during initial access procedure.

The BS may notify whether the WUS operation is abled or disabled to the UE by using SI. When the UE have initial access to the BS, the UE may figure out whether the WUS is enabled or disabled via SI acquisition. If the BS decides to change status of the WUS operation in the cell specific area, the BS may page to the UE to notify the change by using SI update procedure. Then, the UE may notice the change of the status of WUS operation by SI update via PDCCH i.e., paging DCI or PDSCH i.e., paging message. After SI update (modification) procedure, the UE may figure out whether the status of WUS operation is changed or not. When the UE figure out that WUS is enabled, the UE may enable the WUS operation and monitor the WUS signaling. When the UE figure out that WUS is enabled, the UE may disable the WUS operation and skip monitoring WUS signaling. According to this embodiment, the UE may not need to monitor the WUS when the WUS operation is disabled.

The SI update mechanism to notify whether WUS is enable or disable is beneficial in the perspective of cell specific handling. On the other hand, if the BS doesn't broadcast the information of the WUS enabled/disabled i.e., RRC doesn't provide any information for the WUS enabled/disabled, lower layer should consider the handling for the operation e.g. via MAC CE or DCI. In this case, it may be suggested that the DCI mechanism would be utilized to provide information for the WUS enabled/disabled, because the UE should monitor (N)PDSCH to get the MAC CE information after receiving (N)PDCCH.

Figure 7:
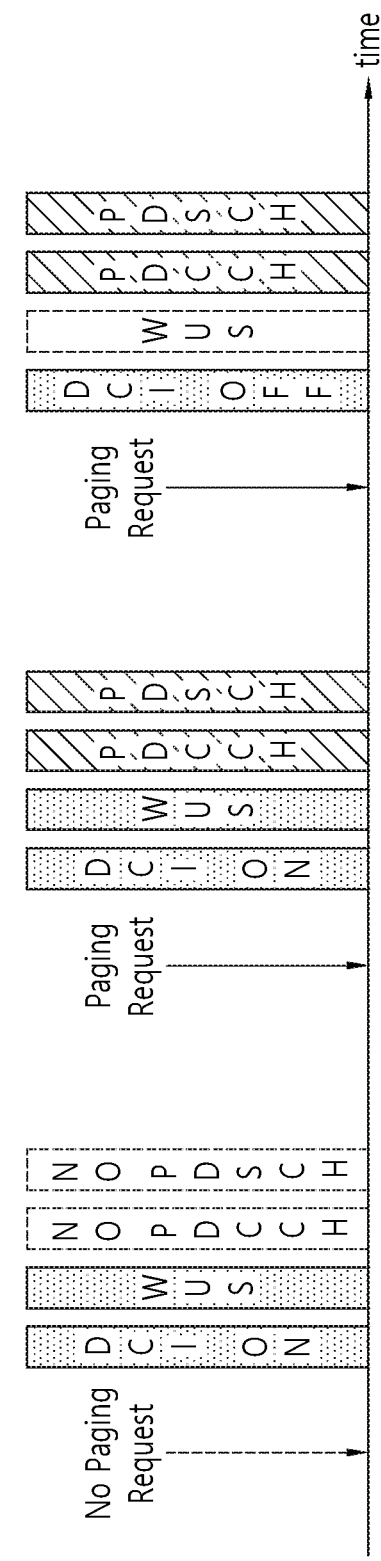
FIG. 7 shows another process of WUS mechanism.

FIG. 7 shows another process of WUS mechanism. The UE may change status of WUS operation according to DCI.

According to this embodiment, the BS may notify whether the WUS operation is abled or disabled to the UE by using DCI. As shown in FIG. 7, since the UE may not know the WUS enabled/disabled when the UE initially acquired SI from the BS, the UE may monitor additional information i.e., DCI for the status of WUS operation. By the additional information, such as DCI, the UE may realize whether the WUS operation is abled or disabled.

Meanwhile, if the BS notifies change of the status of WUS operation by only SI update procedure, whenever the status of WUS operation changes the SI modification procedure is always required. Considering in case that the UE already has valid SI, re-acquiring whole SI to figure out whether the WUS is enabled or disabled may cause unnecessary power consumption. Especially in IoT environment which is so sensitive to power saving such as NB-IoT or MTC, unnecessary SI update procedure is requested to be avoided. In this reason, a combination of the embodiments described above may be proposed.

Figure 8:
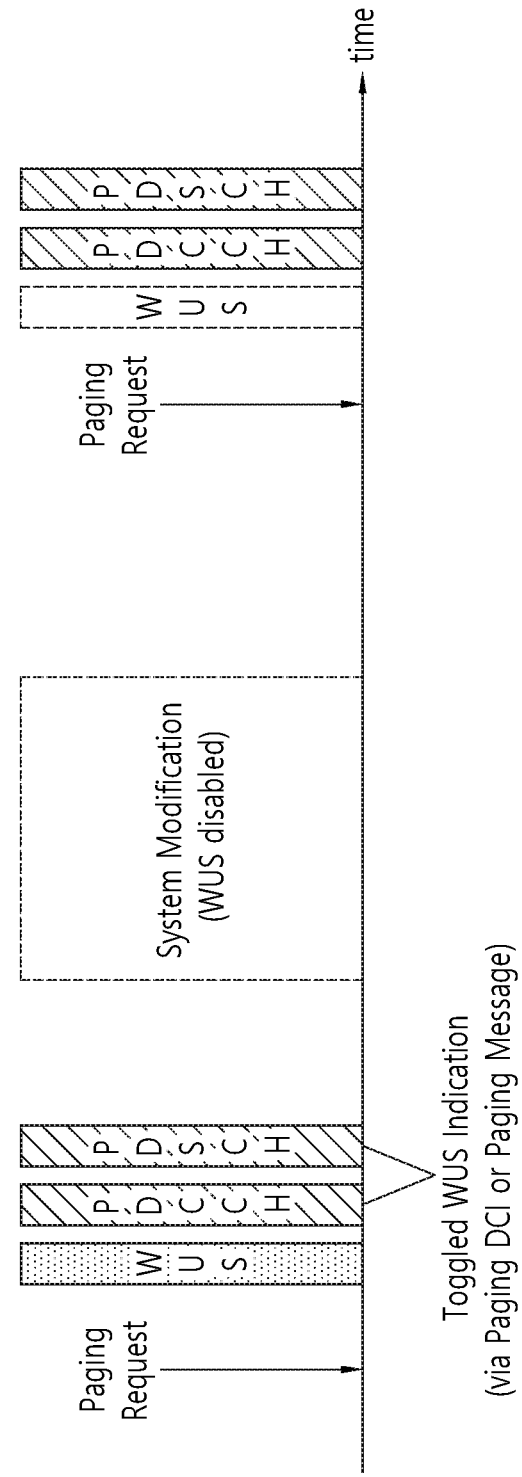
FIG. 8 shows a process of WUS mechanism according to another embodiment of the present invention.

FIG. 8 shows a process of WUS mechanism according to another embodiment of the present invention.

When it is assumed that UE has already valid SI except WUS enabled/disabled information, changing of the status of WUS operation by the SI update procedure may be enhanced. The valid SI may be acquired when the UE perform initial access to the BS. In perspective of that UE, it may be proposed that the UE may realize whether the status of WUS operation is changed based on a certain indication from the BS without SI update procedure. The certain indication may be paging DCI in (N)PDCCH or paging signal message in (N)PDSCH. For example, the UE may figure out that the WUS operation is enabled by acquiring broadcasting SI when the UE initially access to the BS. Since then, if the BS decides to disable the WUS operation, the BS may send paging information via paging DCI or paging signal message, not via new SI. The paging information may indicate semi-static toggled WUS operation information i.e., from WUS enabled to disabled until the next toggle indication. Therefore, the UE may firstly monitor the WUS period to get (N)PDCCH, but after this paging period the UE may not monitor the WUS period, if the UE receives paging DCI or paging signal message which informs that the WUS operation is disabled in the prior WUS period. The WUS period may be related with the transmission period of the paging DCI or paging signal message. Since the UE had received valid SI information at the initial access the UE may not update the SI, when the BS decides to change WUS operation i.e. enabled to disabled in the cell specific area.

Namely, in this embodiment, when UE initially access to a cell, the BS may notify whether the WUS operation is enabled or disabled by broadcasting SI. After that, when the status of the WUS operation is changed, the BS may notify the change of the status of the WUS operation may be semi-statically changed e.g. from enabled to disabled by paging information (e.g. DCI) so that the UE which has valid SI doesn't need to re-acquire SI.

According to embodiments of the present invention, the UE may know whether the WUS operation is enabled or disabled based on SI, so that reduce unnecessary power consumption by monitoring WUS signal even when the WUS is disabled. Further, the UE may update the status of WUS operation based on paging DCI or paging signal message without SI update procedure if the UE has already valid SI.

Figure 9:
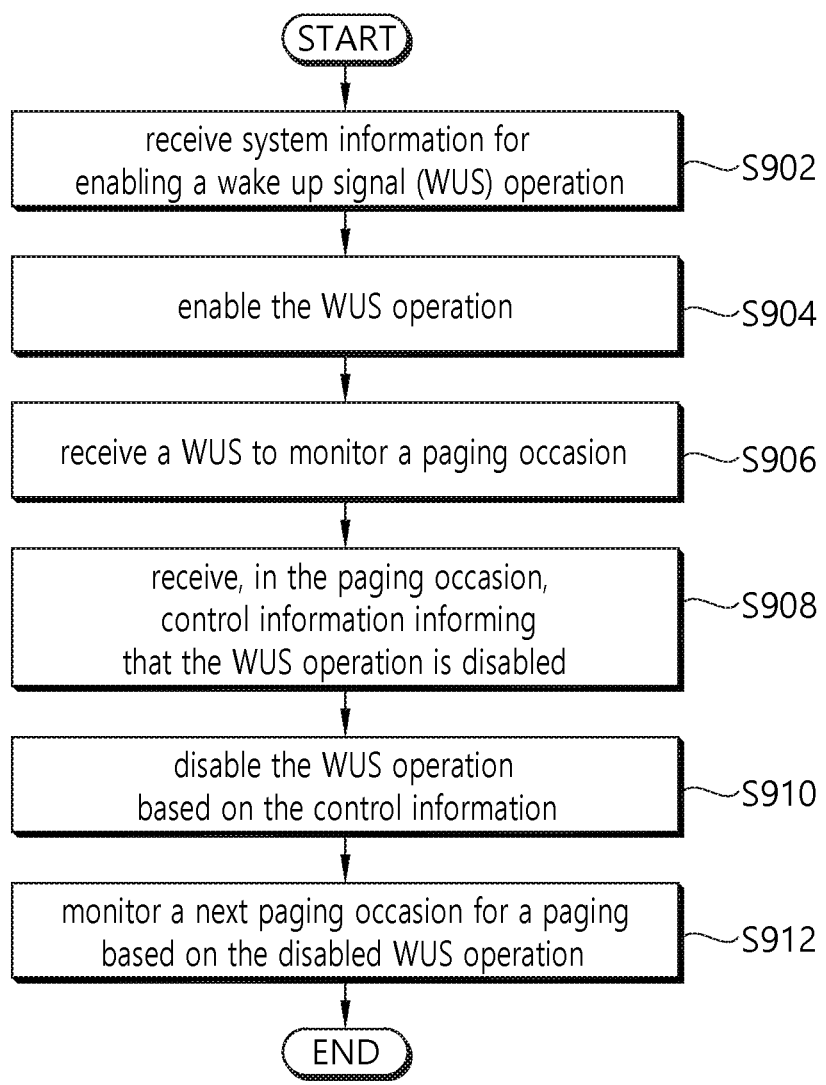
FIG. 9 shows a method for changing status of WUS operation according to an embodiment of the present invention.

FIG. 9 shows a method for changing status of WUS operation according to an embodiment of the present invention.

In step S902, the UE may receive system information for enabling awake up signal (WUS) operation. The system information for the WUS operation may be transmitted, during an initial access procedure to a base station (BS)

In step S904, the UE may enable the WUS operation.

In step S906, the UE may receive a WUS to monitor a paging occasion.

In step S908, the UE may receive, in the paging occasion, control information informing that the WUS operation is disabled. The control information may be different from the system information. The control information may be downlink control information (DCI) transmitted via a physical downlink control channel (PDCCH). The control information may be a paging signal message transmitted via a physical downlink shared channel (PDSCH). The control information may be toggled information.

In step S910, the UE may disable the WUS operation based on the control information.

In step S912, the UE may monitor a next paging occasion for a paging based on the disabled WUS operation. The monitoring a next paging occasion for a paging based on the disabled WUS operation may be directly monitoring a PDCCH and a PDSCH, without waiting for a WUS.

Further, the UE may receive, in the next paging occasion, control information which does not include information related to the WUS operation, and maintain the WUS operation to remain in disabled.

Figure 10:
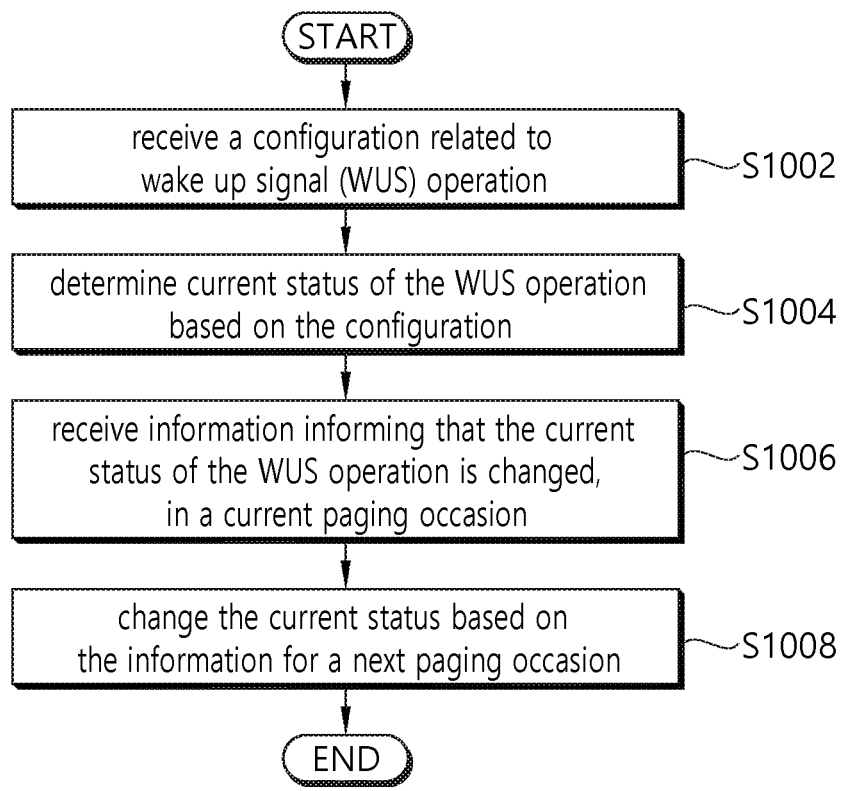
FIG. 10 shows a method for changing status of WUS operation according to an embodiment of the present invention.

FIG. 10 shows a method for changing status of WUS operation according to an embodiment of the present invention.

In step S1002, the UE may receive a configuration related to wake up signal (WUS) operation. The configuration may include a current status of WUS operation. The status of WUS operation may be one of abled status or disabled status.

In step S1004, the UE may determine current status of the WUS operation based on the configuration.

In step S1006, the UE may receive information informing that the current status of the WUS operation is changed, in a current paging occasion. The information may be at least one of paging signal message transmitted via a physical downlink shared channel (PDSCH) and/or downlink control information (DCI) transmitted via a physical downlink control channel (PDCCH).

In step S1008, the UE may change the current status based on the information for a next paging occasion. If changed status of WUS operation is disabled status, the UE may disable the WUS operation, and the UE may monitor PDCCH/NPDCCH/MPDCCH without monitoring WUS signaling for receiving paging information. If changed status of WUS operation is abled status, the UE may monitor WUS signaling. After the UE receives WUS signaling, the UE may PDCCH/NPDCCH/MPDCCH for receiving paging information.

According to embodiments of the present invention, the UE may know whether the WUS operation is enabled or disabled based on SI, so that reduce unnecessary power consumption by monitoring WUS signal even when the WUS is disabled. Further, the UE may update the status of WUS operation based on paging DCI or paging signal message without SI update procedure if the UE has already valid SI.

Figure 11:
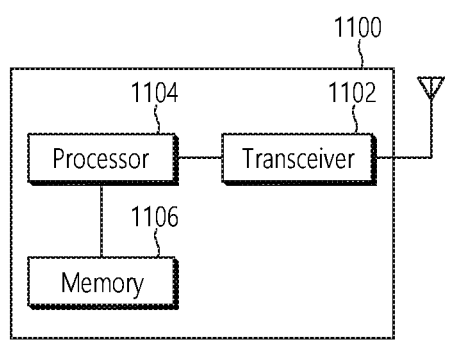
FIG. 11 shows a structure of UE according to an embodiment of the present invention.

FIG. 11 shows a structure of UE according to an embodiment of the present invention.

According to an embodiment of the present invention, the UE 1100 may comprise transceiver 1102, processor 1104 and memory 1106. The memory 1106 is coupled to the processor 1104, and stores a variety of information for driving the processor 1104. The transceiver 1102 is coupled to the processor 1104, and transmits and/or receives a radio signal. The processor 1104 implements the proposed functions, procedures, and/or methods. In the aforementioned embodiments, an operation of the UE 1100 may be implemented by the processor 1104.

The processor 1104 may include application-specific integrated circuit (ASIC), other chipset, logic circuit and/or data processing device. The memory 1106 may include read-only memory (ROM), random access memory (RAM), flash memory, memory card, storage medium and/or other storage device. The transceiver 1102 may include baseband circuitry to process radio frequency signals. When the embodiments are implemented in software, the techniques described herein can be implemented with modules (e.g., procedures, functions, and so on) that perform the functions described herein. The modules can be stored in memories and executed by processor 1104. The memory 1106 can be implemented within the processor 1104 or external to the processor 1104 in which case those can be communicatively coupled to the processor 1104 via various means as is known in the art.

The processor 1104 may be configured to control the transceiver 1102 to receive system information for enabling a wake up signal (WUS) operation. The system information for the WUS operation may be transmitted, during an initial access procedure to a base station (BS)

The processor 1104 may be configured to enable the WUS operation.

The processor 1104 may be configured to control the transceiver 1102 to receive a WUS to monitor a paging occasion.

The processor 1104 may be configured to control the transceiver 1102 to receive, in the paging occasion, control information informing that the WUS operation is disabled. The control information may be different from the system information. The control information may be downlink control information (DCI) transmitted via a physical downlink control channel (PDCCH). The control information may be a paging signal message transmitted via a physical downlink shared channel (PDSCH). The control information may be toggled information.

The processor 1104 may be configured to disable the WUS operation based on the control information.

The processor 1104 may be configured to monitor a next paging occasion for a paging based on the disabled WUS operation. The monitoring a next paging occasion for a paging based on the disabled WUS operation may be directly monitoring a PDCCH and a PDSCH, without waiting for a WUS.

The processor 1104 may be configured to control the transceiver 1102 to receive, in the next paging occasion, control information which does not include information related to the WUS operation, and maintain the WUS operation to remain in disabled.

Figure 12:
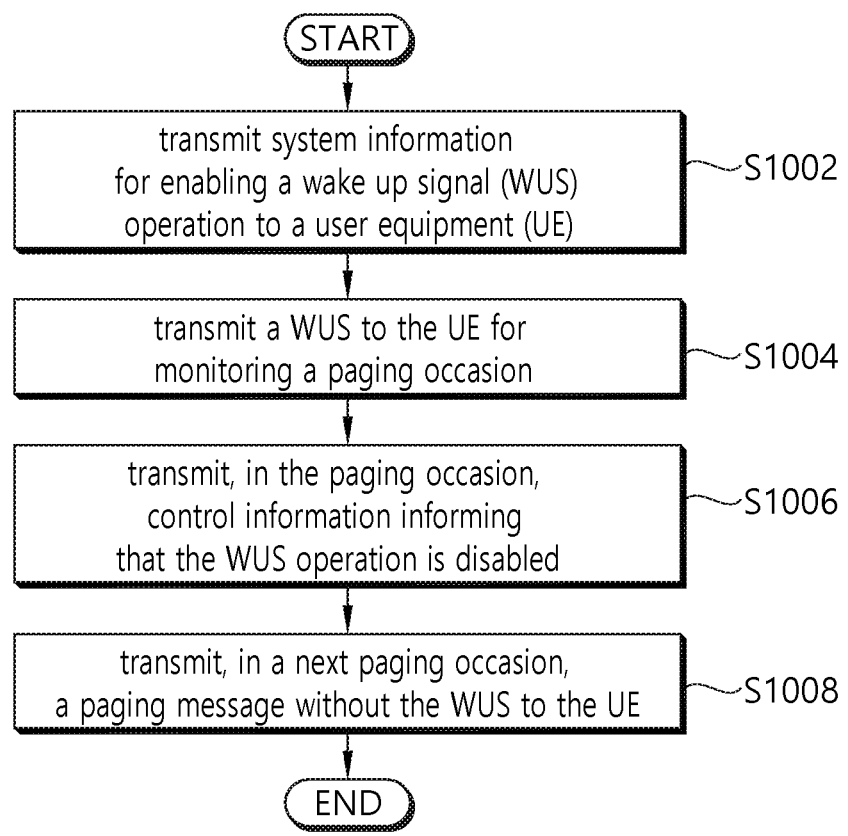
FIG. 12 shows a method for changing status of WUS operation according to an embodiment of the present invention.

FIG. 12 shows a method for changing status of WUS operation according to an embodiment of the present invention.

In step S1202, a base station (BS) may transmit system information for enabling a wake up signal (WUS) operation to a user equipment (UE). The system information for the WUS operation may be transmitted, during an initial access procedure to a base station (BS).

In step S1204, the BS may transmit, in a paging occasion, a WUS to the UE.

In step S1206, the BS may transmit, in the paging occasion, control information informing that the WUS operation is disabled. The control information may be different from the system information. The control information may be downlink control information (DCI) transmitted via a physical downlink control channel (PDCCH). The control information may be a paging signal message transmitted via a physical downlink shared channel (PDSCH). The control information may be toggled information.

In step S1208, the BS may transmit, in a next paging occasion, a paging message without the WUS to the UE.

Figure 13:
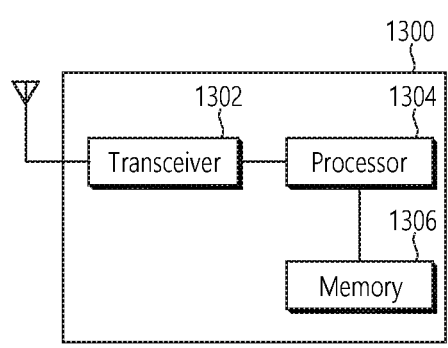
FIG. 13 shows a structure of network according to an embodiment of the present invention.

FIG. 13 shows a structure of network according to an embodiment of the present invention. In this embodiment, the network may be a base station (BS) 1300, and the BS 1300 may be at least one of eNB or gNB, and also may be referred as a serving cell.

According to an embodiment of the present invention, the BS 1300 may comprise transceiver 1302, processor 1304 and memory 1306. The memory 1306 is coupled to the processor 1304, and stores a variety of information for driving the processor 1304. The transceiver 1302 is coupled to the processor 1304, and transmits and/or receives a radio signal. The processor 1304 implements the proposed functions, procedures, and/or methods. In the aforementioned embodiments, an operation of the BS 1300 may be implemented by the processor 1304.

The processor 1304 may include application-specific integrated circuit (ASIC), other chipset, logic circuit and/or data processing device. The memory 1306 may include read-only memory (ROM), random access memory (RAM), flash memory, memory card, storage medium and/or other storage device. The transceiver 1302 may include baseband circuitry to process radio frequency signals. When the embodiments are implemented in software, the techniques described herein can be implemented with modules (e.g., procedures, functions, and so on) that perform the functions described herein. The modules can be stored in memory 1306 and executed by processor 1304. The memory 1306 can be implemented within the processor 1304 or external to the processor 1304 in which case those can be communicatively coupled to the processor 1304 via various means as is known in the art.

The processor 1304 may be configured to control the transceiver 1302 to transmit system information for enabling a wake up signal (WUS) operation to a user equipment (UE). The system information for the WUS operation may be transmitted, during an initial access procedure to a base station (BS).

The processor 1304 may be configured to control the transceiver 1302 to transmit a WUS to the UE for monitoring a paging occasion.

The processor 1304 may be configured to control the transceiver 1302 to transmit, in the paging occasion, control information informing that the WUS operation is disabled. The control information may be different from the system information. The control information may be downlink control information (DCI) transmitted via a physical downlink control channel (PDCCH). The control information may be a paging signal message transmitted via a physical downlink shared channel (PDSCH). The control information may be toggled information.

The processor 1304 may be configured to control the transceiver 1302 to transmit, in a next paging occasion, a paging message without the WUS to the UE.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A,B,C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method performed by a user equipment (UE) in a wireless communication system, the method comprising:
receiving system information for enabling a wake up signal (WUS) operation;
enabling the WUS operation based on the system information;
receiving a WUS to monitor a paging in a paging occasion, while the WUS operation is enabled;
receiving downlink control information (DCI) for paging in the paging occasion;
receiving, on a physical downlink shared channel (PDSCH) based on the DCI for paging, a paging message for initiating a radio resource control (RRC) connection establishment by the UE, wherein the paging message comprises control information for disabling the WUS operation and the RRC connection establishment is initiated upon the UE receiving the paging message;
disabling the WUS operation based on the control information; and
monitoring a paging in one or more paging occasions without receiving a WUS, while the WUS operation is disabled.

2. The method of claim 1, wherein the control information is obtained without acquiring system information.

3. The method of claim 1, wherein the control information is toggled information.

4. The method of claim 1, wherein the system information for the WUS operation is transmitted, during an initial access procedure to a base station (BS).

5. The method of claim 1, wherein the UE is in communication with at least one of a mobile device, a network, or autonomous vehicles other than the UE.

6. A method performed by a base station (BS) in a wireless communication system, the method comprising:
transmitting, to a user equipment (UE), system information for enabling a wake up signal (WUS) operation;
transmitting, to the UE, a WUS to monitor a paging in a paging occasion, while the WUS operation is enabled;
transmitting, to the UE, downlink control information (DCI) for paging in the paging occasion; and
transmitting, to the UE based on the DCI for paging, a paging message for initiating a radio resource control (RRC) connection establishment by the UE on a physical downlink shared channel (PDSCH), wherein the paging message on the PDSCH comprises control information for disabling the WUS operation and the RRC connection establishment is initiated upon the UE receiving the paging message, wherein a paging is monitored in one or more paging occasions without a WUS, while the WUS operation is disabled.

7. The method of claim 6, wherein the control information is obtained without acquiring system information.

8. The method of claim 6, wherein the control information is toggled information.

9. The method of claim 6, wherein the system information for the WUS operation is transmitted to the UE, during an initial access procedure to the BS.

10. A user equipment (UE) configured to operate in a wireless communication system, the UE comprising:
a transceiver;
at least one processor operatively coupled to the transceiver; and
at least one computer memory operatively coupled to the at least one processor and storing instructions that, based on being executed by the at least one processor, control the UE to:

control the transceiver to receive system information for enabling a wake up signal (WUS) operation;
enable the WUS operation based on the system information;
control the transceiver to receive a WUS to monitor a paging in a paging occasion, while the WUS operation is enabled;
control the transceiver to receive downlink control information (DCI) for paging in the paging occasion;
control the transceiver to receive, on a physical downlink shared channel (PDSCH) based on the DCI for paging, a paging message for initiating a radio resource control (RRC) connection establishment by the UE, wherein the paging message on the PDSCH comprises control information for disabling the WUS operation and the RRC connection establishment is initiated upon the UE receiving the paging message;
disable the WUS operation based on the control information; and
monitor a paging in one or more paging occasions without receiving a WUS, while the WUS operation is disabled.

* * * * *